(12) United States Patent
Bismuth et al.

(10) Patent No.: US 8,094,897 B2
(45) Date of Patent: Jan. 10, 2012

(54) METHOD FOR THE PROCESSING OF IMAGES IN INTERVENTIONAL RADIOSCOPY

(75) Inventors: Vincent Bismuth, Paris (FR); Vincent Auvray, Paris (FR); Régis Vaillant, Villebon sur Yvette (FR); Jean Lienard, Igny (FR)

(73) Assignee: General Electric Company, Schenectady, NY (US)

( * ) Notice: Subject to any disclaimer, the term of this patent is extended or adjusted under 35 U.S.C. 154(b) by 679 days.

(21) Appl. No.: 12/267,632

(22) Filed: Nov. 10, 2008

(65) Prior Publication Data

US 2009/0136112 A1   May 28, 2009

(30) Foreign Application Priority Data

Nov. 23, 2007   (FR) ...................... 07 59245

(51) Int. Cl.
  *G06K 9/00* (2006.01)
(52) U.S. Cl. ........................ 382/128; 382/254
(58) Field of Classification Search .......... 382/128–132, 382/254–273; 378/1–166
See application file for complete search history.

(56) References Cited

U.S. PATENT DOCUMENTS

| 5,285,786 | A | * | 2/1994 | Fujii .............................. 600/425 |
| 5,467,380 | A |   | 11/1995 | De Jonge et al. |
| 5,671,264 | A | * | 9/1997 | Florent et al. .................... 378/98 |
| 5,684,720 | A |   | 11/1997 | Hein |
| 5,708,693 | A | * | 1/1998 | Aach et al. ....................... 378/62 |
| 5,740,268 | A | * | 4/1998 | Nishikawa et al. ............ 382/132 |
| 5,825,846 | A |   | 10/1998 | Aach et al. |
| 5,987,094 | A | * | 11/1999 | Clarke et al. ..................... 378/62 |
| 6,049,623 | A |   | 4/2000 | Fuderer et al. |
| 6,115,502 | A |   | 9/2000 | De Haan et al. |
| 6,151,417 | A |   | 11/2000 | Florent |
| 6,154,519 | A |   | 11/2000 | Florent et al. |

(Continued)

FOREIGN PATENT DOCUMENTS

WO   2006/018789 A   2/2006

(Continued)

OTHER PUBLICATIONS

Aufrichtig, R., et al. "X-Ray Fluoroscopy Spatio-Temporal Filtering With Object Detection;" IEEE Transactions on medical Imaging, IEEE Service Center, Piscataway, NJ, US, vol. 14, No. 4; Dec. 1, 1995; pp. 733-746.

(Continued)

*Primary Examiner* — Manav Seth
(74) *Attorney, Agent, or Firm* — Global Patent Operation; Jonathan E. Thomas

(57) ABSTRACT

A method for the processing of images in interventional radioscopy to produce a sequence of de-noised images in which elongated objects of guiding instrumentation equipment are preserved and enhanced. The method of the invention uses a tool for indicating the confidence to be placed in a given pixel as regards its belonging to a piece of guidance equipment. This tool is used to create a combination algorithm capable of re-injecting the pixels having a low contrast-to-noise ratio into the de-noised image. This combination algorithm enables the enhancement solely of the pixels of the guidance equipment with a high confidence value so as not to produce artifacts with the enhancement of false positives.

22 Claims, 5 Drawing Sheets

U.S. PATENT DOCUMENTS

| | | | |
|---|---|---|---|
| 6,173,084 B1* | 1/2001 | Aach et al. | 382/260 |
| 6,204,891 B1 | 3/2001 | Florent | |
| 6,360,025 B1 | 3/2002 | Florent | |
| 6,574,300 B1 | 6/2003 | Florent et al. | |
| 6,973,158 B2* | 12/2005 | Besson | 378/16 |
| 7,840,066 B1* | 11/2010 | Chen et al. | 382/168 |
| 7,876,874 B2* | 1/2011 | Goto et al. | 378/5 |
| 7,978,896 B2* | 7/2011 | Kimura | 382/131 |
| 2002/0034337 A1* | 3/2002 | Shekter | 382/275 |
| 2004/0081340 A1* | 4/2004 | Hashimoto | 382/128 |
| 2008/0122953 A1* | 5/2008 | Wakahara et al. | 348/241 |
| 2009/0147919 A1* | 6/2009 | Goto et al. | 378/86 |

FOREIGN PATENT DOCUMENTS

| | | |
|---|---|---|
| WO | 2007/054862 A | 5/2007 |

OTHER PUBLICATIONS

Guesebroek, J., et al. "Fast Anisotropic Gauss Filtering;" IEEE Transactions on Image Processing, IEEE Service Center, Piscataway, NJ, US, vol. 12, No. 8, Aug. 1, 2003; pp. 938-943.

Gonzalez, R.C, et al., "Line Detection;" Digital Image Processing, Upper Saddle River, NJ: Prentice Hall, US; Jan. 1, 2002; pp. 570-572.

Gonzalez, R.C, et al., "Digital Image Processing, Image Enhancement in the Spatial Domain;" Digital Image Processing, Upper Saddle River, NJ: Prentice Hall, US; Jan. 1, 2002; pp. 128-134.

Freeman, W. T., et al; "The Design and Use of 1-23 Steerable Filters;" IEEE Transactions on Pattern Analysis and machineintelligence, IEE Service Center, Los Almitos, CA, US, vol. 13, No. 9, Sep. 1, 1991, pp. 891-906.

International Search Report for FR. Patent Application 0759245.

* cited by examiner

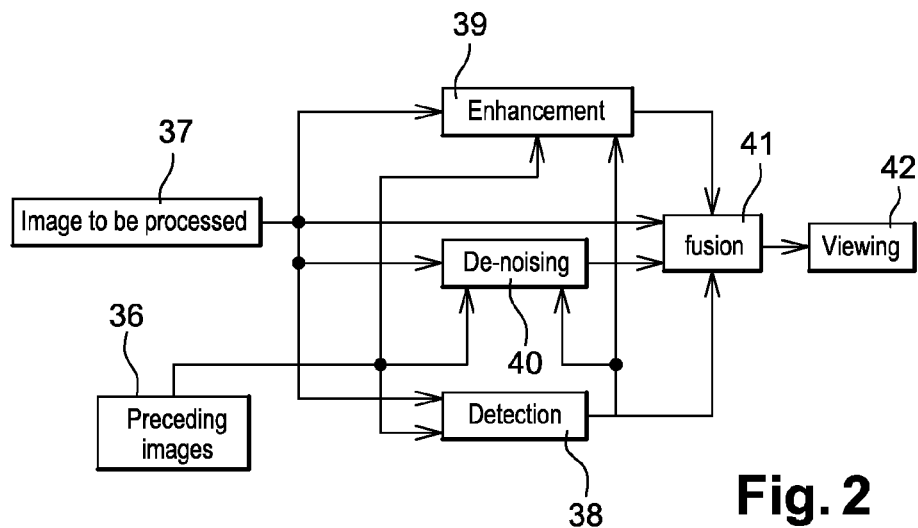
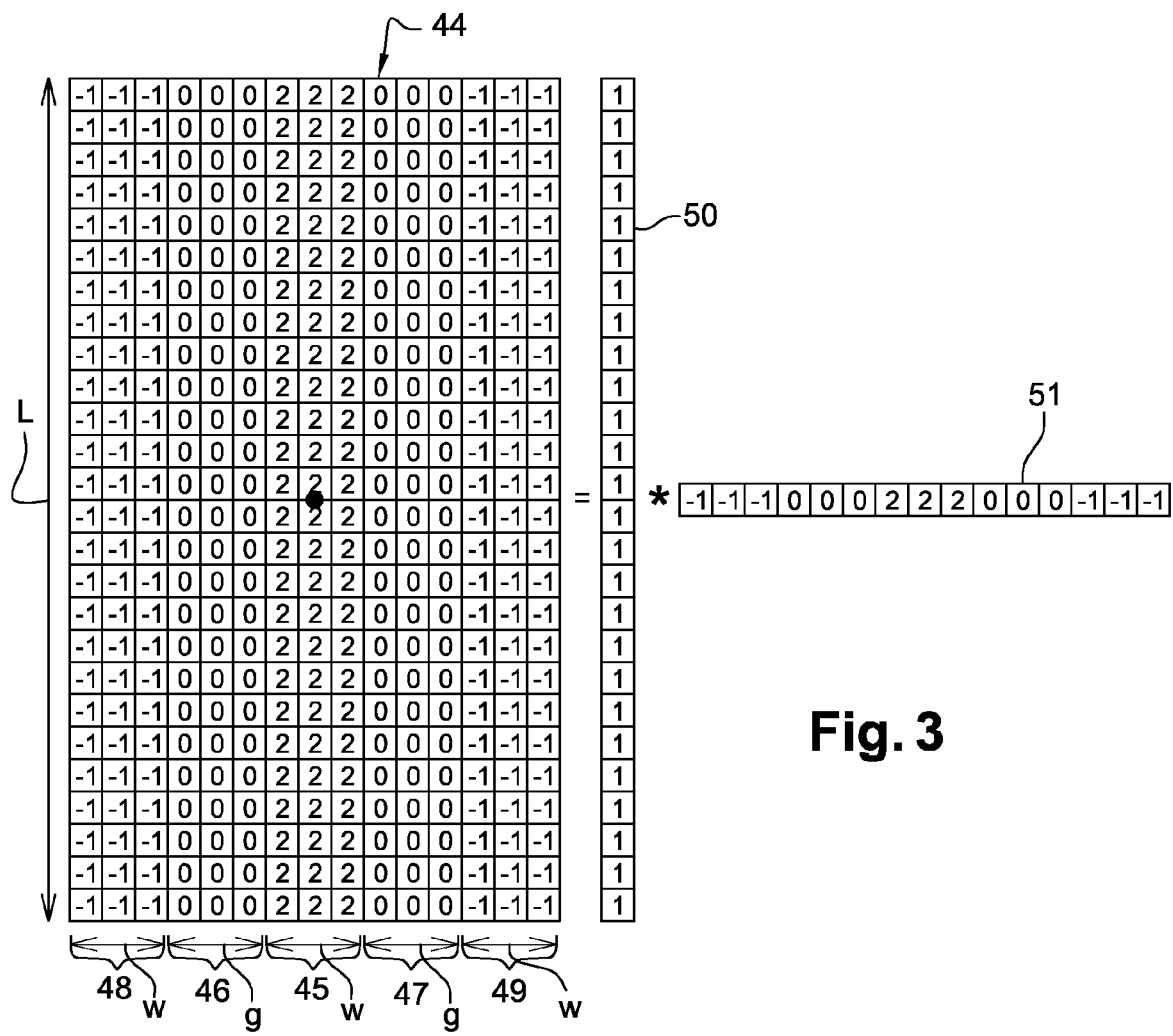

METHOD FOR THE PROCESSING OF IMAGES IN INTERVENTIONAL RADIOSCOPY

CROSS-REFERENCE TO RELATED APPLICATIONS

This application claims priority under 35 U.S.C. §119(a)-(d) to prior-filed, co-pending French patent application serial number 0759245, filed on Nov. 23, 2007, which is hereby incorporated by reference in its entirety.

FIELD OF THE INVENTION

The present invention can be applied to particularly advantage but not exclusively in medical imaging and more especially in radiology. An embodiment of the present invention provides a method for processing images in interventional radioscopy to produce a sequence of de-noised images in which elongated objects of guiding instrumentation equipment are preserved and enhanced. An embodiment of the invention also provides a medical image reviewing station comprising a software program for updating an image-processing method of this kind.

DESCRIPTION OF RELATED ART

Radioscopy today is widely used for diagnostic and therapeutic operations performed under imaging control. Radioscopy is a method of functional imaging which consists in observing the image of the internal organs produced on an X-ray detector by interposing the body between this detector and an X-ray beam. Interventional radioscopy brings together imaging, a piece of guiding instrumentation software and the clinician.

In such an operation, interventional radioscopy involves typically the passage of a piece of guiding instrumentation equipment into the patient's vascular system. Such a piece of software is for example a catheter fitted out with a specific device and associated with an injection of a contrast agent to make the vessels temporarily visible. The progress of the handling of the instrumentation equipment is viewed and controlled by means of X-rays.

As compared with surgery, this interventional approach can be done without any major cuts or incision and results in far shorter recovery and hospitalization time.

However, this type of radioscopy apparatus has drawbacks. The radioscopy images are viewed in real time with exposure to an X-ray beam stretching over a large duration. For an average examination, the total intensity of X-rays emitted during the operation is great. This total intensity of X-rays received may cause excessive irradiation. In the short term and the long term, such irradiation causes health problems for the patient as well as for the medical staff. To help resolve this problem of irradiation, there is a classic solution in the prior art in which the intensity of the X-ray beam is reduced about 100 times relative to the intensity of the X-ray beam of a standard radiography examination.

The immediate consequence of the use of a relatively low intensity is a lowering of the quality of the image as compared with radiography. This drop in quality results in significant deterioration of the signal-to-noise ratio of the content of the images. This is observed from the scintillation and graininess of the image, which commonly results in a noisy image.

Furthermore, the reduction of the intensity of the X-ray beam lowers the visibility of the guiding instrumentation equipment. The time spent in performing the operation is increased by the fact that it is difficult for the physician to see his guiding equipment clearly. In a guide consisting of a thin metal wire, the X-ray opacity is low. Consequently, the guiding equipment has a very low contrast-to-noise ratio in the image. This contrast-to-noise ratio typically ranges from 1 to 4 in fluoroscopy and may sometimes go below 1. The detection of the pixels belonging to the guiding equipment is therefore difficult to achieve owing to their very low contrast-to-noise ratio in the image.

At present, there are noise-filtering methods that are capable of reducing the noise present in the image and compensating for the deterioration of the quality of the image of the guiding equipment.

Examples of this type of noise filtering are described in the U.S. Pat. Nos. 5,467,380 and 5,684,720. These documents describe a method of reducing noise in radiography images with techniques for the filtering of space-time-noise. However, these noise-filtering methods have drawbacks. For, with these methods, the measurements made to isolate the pixels of the guiding equipment from noise are not powerful enough to efficiently separate the pixels of the guiding equipment from the noise present in the image.

There are other noise-filtering methods that are capable of reducing the noise present in the image while at the same time enhancing the contrast of the pixels belonging to the guiding equipment. One example of this type of filtering is described in the U.S. Pat. No. 6,574,300. This document describes a method for the detection and extraction of pixels of guiding equipment in a radioscopy image. This extraction of the pixels of the guiding equipment enables the creation of a binary mask. This binary mask is subsequently used to determine whether it is temporal filtering or spatial filtering that will be chosen to de-noise the image. This document also describes a method for the enhancement of the contrast of the pixels identified as belonging to the guiding equipment.

However, this type of filtering method also has drawbacks. Indeed, during the de-noising of the radioscopic image, we observe one the one hand a partial deterioration of the pixels in the guiding equipment and, on the other hand, the presence of many false positives in the image. The image produced with this method is a composite image formed by a spatially filtered image and a temporally filtered image, giving it an artificial appearance. Furthermore, since the transitions within a same object between the detected parts and the non-detected parts are binary, they give the impression that the object is chopped up into pieces. This effect which varies from one image to another of a sequence of images gives the impression that the pixels of the guiding equipment are scintillating and this is inconvenient. With this type of filtering, the image viewed by the clinician is of poor quality.

The current filtering methods used are therefore not suited to the detection and enhancement in a radioscopy image of an object that is as elongated as a piece of guiding equipment and has the same low contrast-to-noise ratio. The term "elongated object" is understood to mean an object with a shape that is elongated like a wire and possibly curved.

SUMMARY OF THE INVENTION

Embodiments of the invention address these and other disadvantages and provide an image-processing method configured to produce a de-noised radioscopic image while at the same time enabling the detection, preservation and enhancement of the pixels of guiding equipment in the image.

To this end, an embodiment of the invention comprises an efficient and fast algorithm for detecting elongated objects. In practice, these elongated objects are guiding instrumentations equipment, especially catheters, or guides used in interventional radiology.

This detection algorithm is used to assign each pixel of the image a value that expresses a rate of confidence to be placed in said pixel with regard to its belonging to an elongated object.

To detect these pieces of guiding equipment, the detection algorithm of the invention is capable of detecting chiefly elongated objects having very low contrast-to-noise ratios. The detection algorithm of the invention is also capable of detecting objects having highly curved shapes.

The detection of the elongated objects is implemented by a family of detection filters that are directional, oriented, separable, recursive and fast. These detection filters have short computation times even for long filters having several orientations.

The detection algorithm gives a confidence map at output. This confidence map is a set of values assigned to the pixels of the image which provide information on the rate of confidence that can be placed in a pixel as regards its belonging to an elongated object.

An embodiment of the invention comprises an algorithm for filtering the noise present in the image. This second filtering algorithm is capable of deeply reducing the background noise present in the image. This second filtering algorithm may, for example, be a spatial filter followed by a recursive temporal filter. The coefficients of the space-time filter are determined as a function of the raw image to be processed and corresponding confidence map. In order to preserve the pixels of the guiding equipment during the de-noising operation, the invention computes said coefficients in also taking account of the previous raw images and as well as their respective confidence maps.

An embodiment of the invention also comprises an algorithm for enhancing the pixels of the radioscopic image.

In order to produce a de-noised image for which the pixels of the guiding equipment are preserved, an embodiment of the invention provides a fusion algorithm capable of combining the de-noised image, the raw image and the enhanced image as a function of a confidence map.

Use of the confidence map during the fusion enables the re-injection of the pixels having low contrast-to-noise ratios into the de-noised image. It also enables the enhancing of only those pixels of the guiding equipment that have been identified with a high confidence value so as not to produce artifacts with the enhancement of false positives. In an embodiment, a method of the invention is therefore better suited than currently used filters to filtering noise in radioscopic images. In an embodiment, an algorithm of the invention can easily be implemented in an X-ray apparatus.

BRIEF DESCRIPTION OF THE DRAWINGS

Embodiments of the invention will be understood more clearly from the following description and from the accompanying figures. These figures are given by way of an indication and in no way restrict the scope of the invention.

FIG. 2 illustrates means to implement the method of the invention.

FIG. 3 shows an example of a convolution core of a detection filter of the detection algorithm according to the invention.

DETAILED DESCRIPTION

Figure 6:
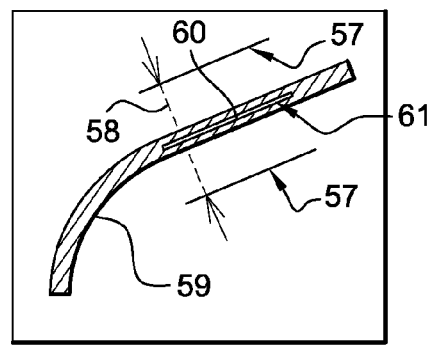
FIG. 6 is a schematic view of a mode of determining the filter to be applied to the enhancement of the image
Figure 7:
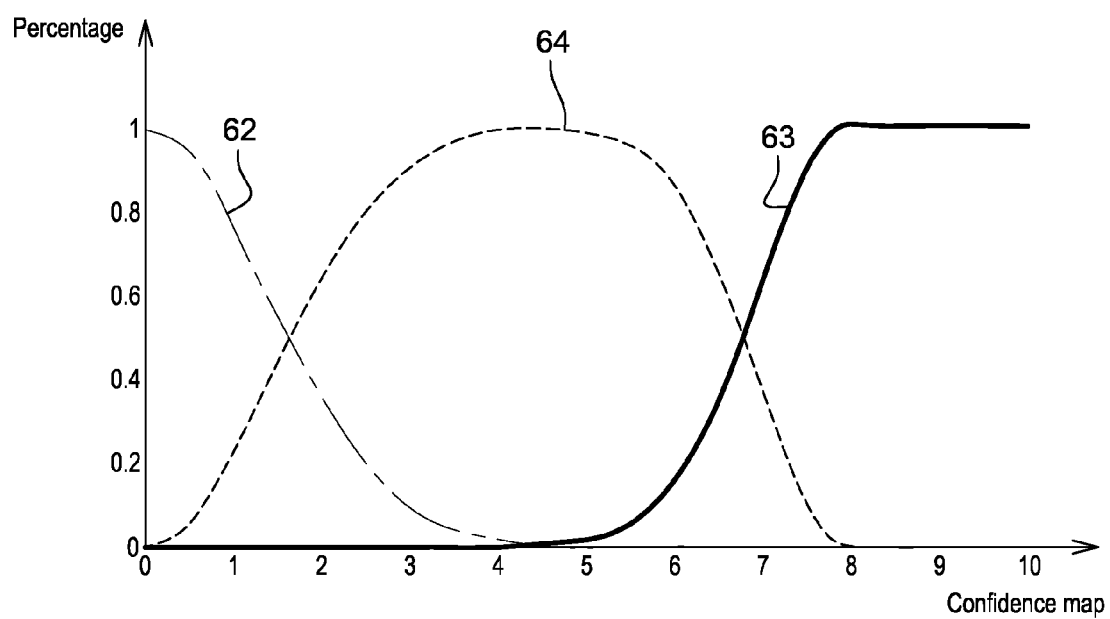
FIG. 7 is a graph showing the curves of the combination functions for combining the de-noised image with the enhanced image and with the raw image as a function of the confidence map, according to the invention.
Figure 8:
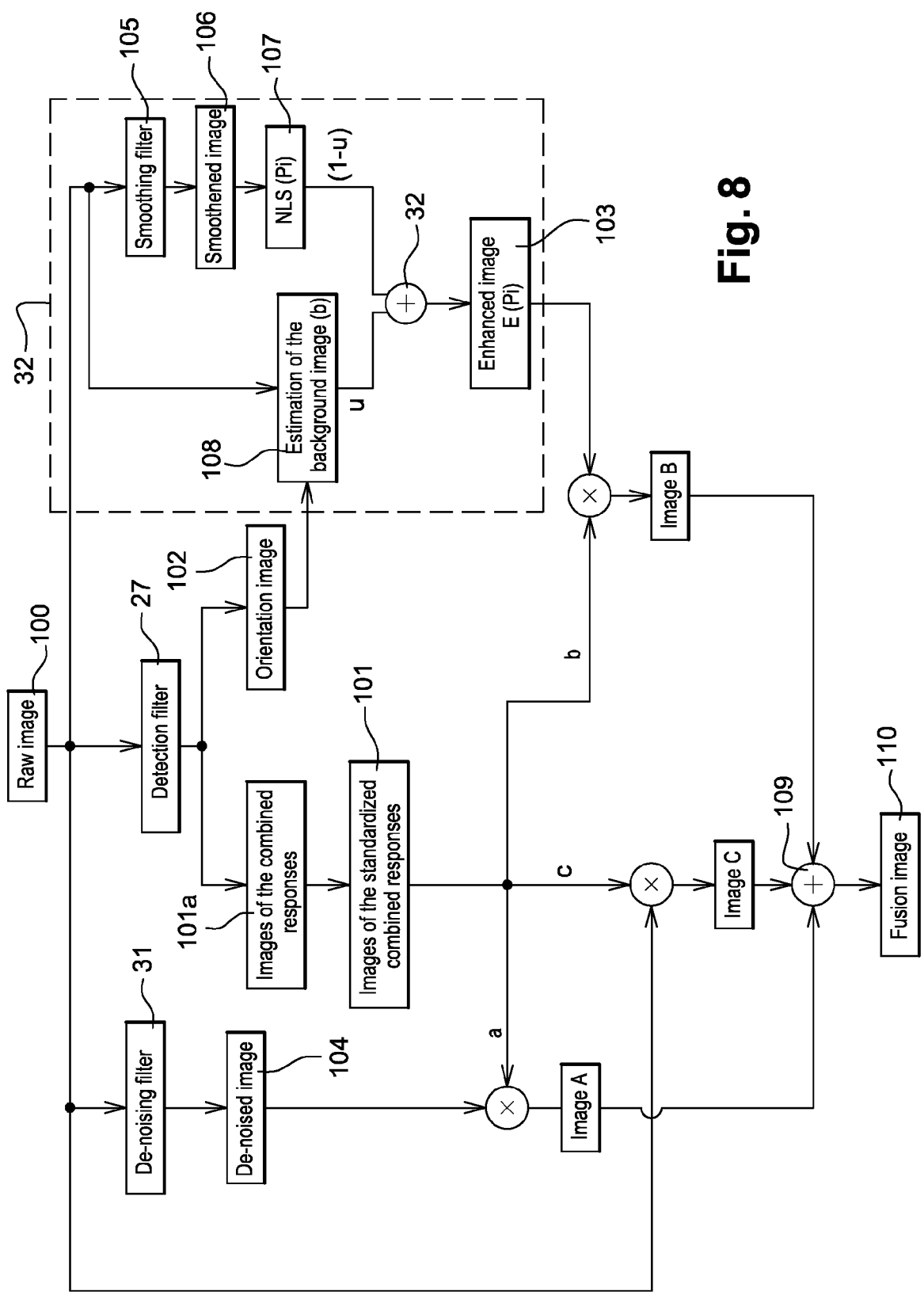
FIG. 8 is a schematic overview of the implementation of the method of the invention.

In order to make it easier to understand the description of the method of the invention, reference is made to the elements 100 to 110 of FIG. 8 in the description of FIGS. 1 to 7.

Figure 1:
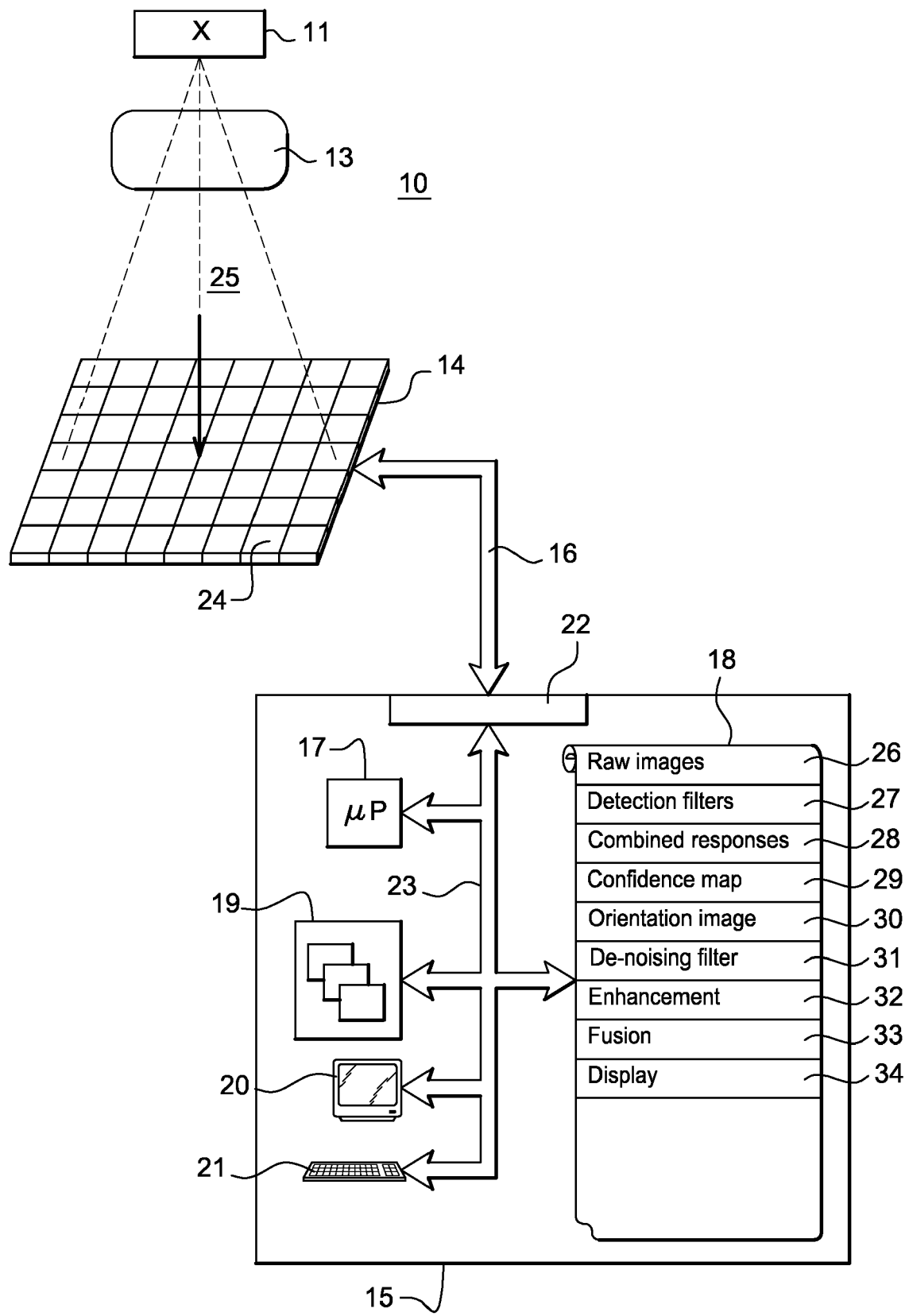
FIG. 1 shows a radioscopic image-production apparatus implementing an image-processing method, according to the invention.

FIG. 1 illustrates a radioscopic image-production apparatus implementing a radioscopic image-processing method according to the invention. Radioscopy is a medical imaging system used to obtain a dynamic radiological image, i.e. a sequence of images or a video of the patient. This tool is used for diagnostics and interventional purposes, i.e. during the treatment of the patient, as an aid in an interventional operation on the patient. Radioscopy is for example used to assist in angiography (diagnostics) or angioplasty (interventional action).

The images produced by the production apparatus 10 result from detecting an incident irradiation coming from a radiation source 11 to which the patient 13 is exposed. The apparatus 10 also has an image detector 14 and a control circuit 15.

The image detector 14 sends out electrical signals corresponding to the energy of the rays received. These electrical signals are transmitted to the control circuit 15 by means of an external bus 16. The image detector 14 is thus coupled electrically to the control circuit 15.

The electrical signals enable the circuit 15 to produce an image corresponding to the part of the body analyzed. These images may be viewed by means of the screen of this circuit, or printed or memorized.

In one example, the circuit 15 has a microprocessor 17, a program memory 18, a data memory 19, a display screen 20, a keyboard 21 and an input-output interface 22, these elements being interconnected by a internal bus 23.

The detector 14 has numerous detection zones or pixels 24 arranged in two dimensions. The first dimension is the x-axis and the second dimension is the y-axis. The image is thus divided into rows and columns corresponding to a matrix sized (n×m). The control circuit 15 enables the measurement of a charge created in each respective pixel of the detector 14, in response to an incident irradiation. The dimensions of the image processed by the circuit 15 are preferably the same as those of the starting image. They are those of a matrix, for example a matrix sized 1024×1024 pixels, 512×512 pixels or 256×256 pixels or any other size or even a non-square matrix. The dimensions are not exhaustive and may be changed for the purposes of the invention.

At the time of a radiological exposure, a radiation dose 25 is sent by the radiation source 11 to the patient's body 13. This dose 25 goes through the patient's body 13 and is received by the image detector 14.

The image revealed by the detector 14 should be capable of being displayed and/or viewed by a medical clinician or a specialist in medical imaging. However, after the passage through the image detector, this image remains a coarse and unprocessed image 100. It has artifacts and above all a noise due to the nature of the radiation and a noise due to the nature of the detector.

In the present description, one or more apparatuses or computer programs are configured to perform one or more method functions, or steps. This means that these functions are executed by a microprocessor of this apparatus or an apparatus comprising the program, said microprocessor being then controlled by instruction codes recorded as a program in a memory of the apparatus. These instruction codes are used to implement the means of the apparatus and therefore to perform the function(s) undertaken.

The program memory 18 is divided into several zones, each zone corresponding to a function or mode of operation of the program of the control circuit 15.

The memory 18, depending on variants of the invention, comprises several zones. A zone 26 comprises instruction codes for the loading into the data memory 19 of a succession of raw images to be processed. A zone 27 has instruction codes to create of family of directional, 2D, recursive, separable and orientable filters to be applied to a raw image 100.

A zone 28 has instruction codes to combine the responses given by the set of filters of the family of filters. A zone 29 comprises instruction codes to standardize the combined responses. This zone 29 also has instruction codes to determine a contrast-to-noise ratio threshold. This zone 29 outputs a confidence map 101 in which each pixel of the image is assigned a standardized value of the computed contrast-to-noise ratio if this ratio is above the threshold as well a elongated pixel attribute. Otherwise, the corresponding pixel is assigned the value zero as well as a non-elongated pixel attribute.

A zone 30 comprises instruction codes to provide an orientation image 102 in which each pixel is assigned an orientation and a local direction of the filter giving the strongest response.

The memory 18 comprises a zone 31 comprising instruction codes to determine the de-noising filter to be applied to the raw image 100. This de-noising filter is a space-time filter. The coefficients of this filter are determined as a function of the raw image 100 to be processed and the corresponding confidence map 101 and, as the case may be, the previous raw images and their respective confidence maps.

A zone 32 comprises instruction codes to apply an enhancement algorithm to the raw image 100 in order to enhance the intensity of the pixels of said image. A zone 3 comprises instruction codes for the fusion of the de-noised image 104, the raw image 100 and the enhanced image 103 on the basis of the confidence map 101. A zone 34 comprises instruction codes to display the fusion image.

FIG. 2 shows a preliminary step 36 in which the control circuit 15 stores the previously acquired raw images as well as their respective confidence maps in the data memory. At a following step 37, the circuit 15 acquires a new raw image 100 to be processed.

Detection, enhance, and de-noising steps 38 to 40 are executed simultaneously by the circuit 15. At the step 38, the circuit 15 applies a guiding equipment pixel detection algorithm 27 to the raw image acquired at the step 37.

The equipment to be detected in the radioscopy images are thin and flexible rods or tubes placed in any orientation whatsoever in the patient's body. To detect these elongated pieces of guiding equipment in the raw image 100, the circuit 15 uses specific filters enabling them to be detected. To this end, the circuit 15 creates a family of filters, one filter for each orientation *i in the plane of the image, in order to detect all the pixels of these pieces of equipment. These pieces of guiding equipment may be inter alia: guides, catheters or vascular endoprosthetic devices.

In a preferred embodiment, the filters of the family of filters are oriented, recursive, directional, separable and rapid filters. One example of filters used to perform this detection is shown in FIG. 3 for a direction along the axis Y. These filters are successively convoluted with the raw image. The responses of these filters, as shown in FIG. 8, are used by the circuit 15 in order to determine a confidence map 101 and an orientation image 102 for the raw image 100 to be processed.

At the step 39, the circuit 15 applies an enhancement algorithm 32 to the raw image 100 acquired at the step 37. An example of an application of the enhancement algorithm 32 to the raw image 100 according to the invention is described in FIG. 5. This enhancement algorithm 32 outputs an enhancement image 103 as shown in FIG. 8.

At the step 40, the circuit 15 applies a de-noising algorithm 31 to the raw image 100 to be processed, acquired at the step 37. The de-noising algorithm 31 is implemented by a space-time filtering. The circuit 15 computes the parameters of this filter as a function of the raw image 100 to be processed, the confidence map 101 of said image acquired at the step 38, and possibly, previously acquired raw images for each of these images. This gives a fairly powerful filter capable of de-noising and preserving pixels of the guiding equipment.

The parameters thus computed increase the de-noising capacity of this filter. However, the increase in the de-noising power of the filter as achieved may cause the deterioration in the appearance of the guiding equipment in the image. This deterioration of appearance is not inconvenient since the circuit 15 subsequently restores the appearance in a fusion step 41.

In a preferred embodiment, the de-noising filtering algorithm 31 is implemented as a spatial filter followed by an adapted temporal filtering. The spatial filter may be a filter of the wavelet filter type. The temporal filter may be a recursive temporal filter. Thus, the raw image 100 is first of all de-noised with wavelet techniques before the control circuit 15 applies a recursive temporal de-noising operation to it. The image produced by this de-noising will be called a de-noised image 104 as shown in FIG. 8.

In the step 41 following the steps 38 to 40, the circuit 15 applies a fusion algorithm 33. This algorithm 33 combines the de-noised image 104, the raw image 100 and the enhanced image 103 as a function of the corresponding confidence map 101.

This combination is done as follows for a given pixel of the raw image 100 to be processed:

- if the value of the confidence map 101 that is assigned to said pixel is low in terms of absolute value, it means that there is no presumption of a elongated object in this pixel, and the algorithm will give preference mainly to the de-noised image 104 to the detriment of the other two images;
- if the value of the confidence map 101 that is assigned to said pixel is high in terms of absolute value, i.e. there is certainly a elongated object in the pixel considered, then the algorithm will give preference to the enhanced image 103 in order to make this object as visible as possible,
- if the value of the confidence map 101 that is assigned to said pixel is in a zone of uncertainty in which the values of the confidence map 101 cannot be used to make a clear choice, the algorithm will give preference to the raw image 101 in order to keep any information that would be useful.

The combination of the images made by the fusion algorithm 33 is described with reference to FIG. 7.

The fusion algorithm 33 outputs a fusion image 110 that is displayed for and/or viewed by a clinician in a step 42.

FIG. 3 shows an example of a convolution core of a filter 27 of a family of filters for the detection of guiding equipment. In order to make it easier to understand the description of the specific filters created to detect the pixels of guiding equipment, a description shall be made first of all of a vertical filter oriented along an axis Y relative to the image, having essential properties of the invention, namely separability and recursivity before these properties are generalized to cover any orientation *i of said filter.

In the example of FIG. 3, the core of the filter has a vertical direction and an initial orientation *=0. This filter will naturally emphasize the objects whose elongated direction is oriented along the axis Y.

The convolution core 44 is a matrix of coefficients with a size far smaller than that of the image. This matrix of coefficients may be square. The coefficients of the core are applied in a weighting to numerical values of a group of pixels having the same size as the matrix. The pixel at the center of the matrix is assigned a value called a filtered value corresponding to a combination of these weighted values, generally the sum.

Determining Parameters of the Vertical Filter:

The control circuit 15 will determine the coefficients of the vertical filter having a zero initial orientation and a length L. It also determines the same elements for orientations *i of this filter to be generated. These coefficients and this length L are identical for any orientation *i of this filter. A family of filters is formed by the vertical filter and the filters having the same elements for the orientations *i.

Determining Coefficients of the Filter:

At a given orientation *i, i belonging to the interval [1,n], n being equal to the number of filters of the family of filters to be generated by the circuit 15, the core 44 of the vertical filter performs a measurement corresponding to a contrast measurement. It can be defined in the preferred example as follows:
- on a central block 45 having a size or width w, length L, the value of its coefficients is equal to 2,
- on two intermediate blocks 46 and 47 situated on either side of the central block 45, the value of their coefficients is equal to zero. The two intermediate blocks 46 and 47 have a size or width equal to g and a length L,
- on two final blocks 48 and 49, situated respectively beside the two intermediate blocks 46 and 47, the value of their coefficients is equal to −1. The two final blocks 48 and 49 have a size or width equal to w and length L.

In order to implement an algorithm 27 with a computation speed as great as possible, the values 2 and −1 are chosen for the coefficients of the core of the filter. These values are particularly useful because they require only a one-bit shift and operations of addition instead of the multiplication required in the prior art.

In practice, an embodiment of the filter computes the difference between the central block 45 and the final blocks 48 and 49, far from the central block, and assigns it to the central pixel of the filter. When this filter is applied to an image comprising a elongated object, it computes the contrast of this object. The reliability of this measured contrast is all the greater as the length of the filter L is great, since the integration of the pixels reduces the noise. When there is no elongated object and inasmuch as the signal on either side of the axis Y is identical, the output result is equal to zero. It is equal to zero so long as the underlying background varies linearly.

Indeed, the filter (−1, 2, −1) is a second derivative which assigns zero to any constant or linear signal.

The intermediate blocks 46 and 47 of the zero coefficients are implemented to take account of the uncertainty over the size of the guiding equipment. This enables the use of only one filter which performs well for many instruments such as guides, catheters by different manufacturers and of different shapes. It is enough to change the size g of the filter.

The parameters of the filter are determined by the operator so that they can be adapted to the radioscopic images. According to the standard properties of the guiding equipment, the width w=3 pixels is particularly suitable. Indeed, this width of three pixels is an approximation of the width of the guide in a standard radioscopic image.

Determining the Length L of the Filter:

The filter 44 determined by the circuit 15 must firstly fulfill the execution time conditions and secondly not tamper with the curvature of the guiding equipment.

The length L of the filter can be determined in several ways. In a preferred example, the circuit 15 chooses a length of the filter that does not depend on the orientation of the filter but is one dictated by an operator of the device or system. This chosen length will be that of each filter of the family.

The length of the filter may also be determined by the circuit 15 as a function of the curvature of the objects to be sought. The length L of the filter is preferably the longest possible. The longer the filter, the greater the extent to which the problem of noise present in the image to be processed is overcome. Indeed, the longer the filter, the greater the increase in the integration dimension. The integration reduces the noise in proportion to the square root of the length L of the filter. The only parameters that limit the length of the filter to be applied are the curvature of the objects to be detected and the execution time.

For example, for a cardiology intervention, an appropriate length with the curvature of the guiding equipment is situated between 30 and 40 pixels. For a neurological intervention, where the guiding equipment is more curved because the vessels in the brain are more sinuous, the appropriate length is between 10 and 20 pixels. In an embodiment, an operator may dictate this length L according to his/her requirements.

Determining the Set of Orientations *i of the Filter to be Generated:

The orientations *i of filters to be generated are determined in the interval [−*/2, */2]. In practice, these regularly spaced-out orientations are chosen in the interval [−*/2, */2].

Determining the Number of Filters to be Generated:

In a preferred element, the number of filters of the family of filters to be generated is (2*L−2)/w when g=0. This gives a family of filters where there will be no overlapping between two filters of the family at their ends.

Property of Separability of the Vertical Filter:

In the prior art, the control circuit 15 convolutes the filter 44 having the length L with the raw image 100 to measure the contrast of the pixels of the image. However, the use of this type of filter considerably increases the computation time of the circuit 15. Indeed, for a pixel of the given image, the circuit 15 computes L2 multiplications and L2−1 additions.

To reduce this computation time, by way of improvements, the circuit 15 of the invention uses properties of separability to be applied to the filter for each orientation *i of the family of filters. A 2D filter is said to be separable if it is possible to split the core filter into two 1D filters applied successively.

One of the two 1D filters obtained with the property of separability is constant in one direction. The other of the two 1D filters is non-constant in another direction. The orientation

*i of a filter is considered here to be the angle formed by the direction from which the filter is constant with the y-axis referenced Y.

The circuit 15 can thus process the rows and the columns of the raw image 100 independently. The 2D filter of the invention is therefore preferably separable.

The 2D vertical filter 44 of FIG. 3 is split into two successive 1D filters. It is split into firstly a constant vertical filter 50 having a length L whose coefficients are equal to 1 on each pixel and, secondly, a horizontal filter 51 that is equal to one of the lines of the vertical filter 44.

In a preferred example, the width w of the central block 45 and the final blocks 48 and 49 is defined as being equal to the size g of the intermediate blocks 46 and 47. In one example, the sizes w and g are equal to three pixels.

In this case, the non-constant filter which is horizontal here has a core equal to −1-1-1000222000-1-1-1. This last core may for its part be split into two successive filters, one constant 111 and the other −100000200000-1 with only three non-zero coefficients. This splitting of the non-constant filter further reduces the computation time.

Using a separable filter 44, the circuit 15 achieves a considerable gain in computation time as illustrated in Table 1:

|  | Number of additions | Number of multiplications by two | Number of sign changes |
| --- | --- | --- | --- |
| Direct convolution | $3 * w * L - 1$ | $w * L$ | $3 * w * L$ |
| Using the properties of separability | $(w - 1) + (L - 1) + 2$ | 1 | 1 |

With the parameters chosen by the circuit 15 concerning the length L of the filter and a size w or g of the blocks of the core 44, the computation time of said circuit 15 is approximately eight times less than the computation time of the prior art. This considerable reduction of the computation time is due only to the implementation of the decomposition of the filter. The invention will further optimize this reduction of the computation time by defining a property of recursivity applicable to the initial vertical filter.

Property of Recursivity of the Constant Vertical Filter:

The longer the filter, the greater is the rate of confidence to be placed in the detected pixels. However, the longer the filter the greater is the computation time. To resolve this drawback, the invention implements an algorithm to formulate the constant filter recursively.

The constant vertical filter 50, which is a part of the splitting of the separable vertical filter 44, can be processed recursively. Indeed, in one example, let us consider an image column and note Pi as the ith pixel of this column. The filtering of Pi by the constant vertical filter 46 gives F(Pi) at output. To compute the contrast of the next pixel Pi+1, the circuit 15 deduces the responses F(Pi+1) of the constant vertical filter 46 of the pixel Pi+1 of the response of the filter F(Pi) of the preceding pixel Pi.

Let Pstart denote the pixel having the smallest index taken into account in the computation of F(Pi). Let Pend denote the pixel having the greatest index taken into account in the computation of F(Pi+1). Then F(Pi+1)=F(Pi)−Pstart+Pend, taking the coefficient 1 into account.

This formula is valid anywhere in the image except for the borders of the image. Using a processing of this kind, the application of the filter to the image requires only two additions of pixels instead of the L−1 additions required in a direct approach.

Advantageously, embodiments of the invention thus reduce computation time by generalizing the property of separability and the property of recursivity to all the orientations *i of the filter generated by the circuit 15 while at the same time keeping the same coefficients as those described here above and the same filter length L for each filter.

The filters having orientations *i to be generated by the circuit 15 necessarily have the following properties, namely:
the coefficients of the core are −1.0 or 2,
the filter is separable, and
the filter is formulated recursively.

Generalization of the Property of Recursivity of the Constant Filter with Orientations *i:

During a rotation of the vertical filter 44 in an orientation *i by interpolation, the values of the coefficients of the core of the filter become real and are no longer values of 1 only. Thus, the advantage of having to do only additions is lost and it becomes necessary to introduce multiplications by floating-point decimal numbers to compute the image convoluted by the filter.

The main difficulty of the rotation of the constant filter is the change in values of the coefficients of the core because of the interpolation. The operations in this case are no longer additions but multiplications that increase the computation time.

The values obtained if the constant filter is in rotation will no longer be the simple coefficients 1, 0, and 2. Similarly, this property of recursivity cannot be used with a filter of any orientation. And the property of separability will not be exact either, although there may be good approximations of it.

To resolve these problems, the invention implements an algorithm to formulate the constant filter 50 recursively for any orientation *i whatsoever while keeping the property of separability of the filter and the coefficients −1.0 and 2 of the core of the filter.

Embodiments of the invention implement, for any orientation *i of the filter, an algorithm to convert the constant filter into a recursive, discrete constant filter.

For an orientation *i different from *i=0, the circuit 15 converts the oriented constant filter into a discrete, constant oriented filter. This conversion is implemented for example by the Bresenham algorithm. This Bresenham algorithm can be used to plot a discrete line passing through the point of the image where the filter will be applied. On this line, as and when the plotting is done, the pixels are numbered.

The Bresenham algorithm commonly used to plot discrete lines enables the connection of two given points by a segment giving the best possible impression of being straight and of having a constant thickness.

The Bresenham algorithm is a classic algorithm used to connect two points by a segment on an entire frame. Other algorithms used to obtain a discrete segment can also be used.

The responses given by the discrete oriented filter have elements in common. Indeed, knowing the previous response of the filter, the circuit 15 can compute the next response of the filter. Hence, apart from the computations of initialization on the edges of the image which take up negligible computation time, the circuit 15 performs only two operations whatever the length L of the filter. The filters of the family of filters are thus orientable, inexpensive, recursive, separable, easy to implement and fast.

The circuit 15 computes a parameter for initializing the filter. To this end, the circuit 15 computes the sum of the (L−1)/2 pixels preceding a central pixel L/2 and (L−1)/2 pixels following this central pixel along the discrete line. This is easy as the pixels were numbered during the plotting of the Bresenham line. Thus, the circuit 15 computes the sum, weighted by the coefficient 1, of the L consecutive pixels along the discrete line of the filter centered on the central pixel.

The circuit 15 starts applying the filter to the raw image 100, at a position of a pixel distant from the borders of the image. The central pixel is placed at the pixel having the position L/2 on the discrete Bresenham line. On the Bresenham line, the circuit 15 determines the pixel Pstart preceding the central pixel by (L−1)/2−1 pixels and the pixel Pend following the central pixel by (L−1)/2 pixels. The circuit 15 computes a response R1 of the filter to the central pixel having the position L/2: R1=initialization parameter−pixel Pstart+pixel Pend.

Then, the circuit 15 shifts the central pixel to the pixel at the next L/2+1 given by the Bresenham algorithm. The values of the pixels Pstart and Pend are again recomputed.

The control circuit 15 applies the discrete filter to the pixel at the next position L/2+1 and outputs the response R2. The response R2 is equal to the previous response R1 of the filter, from which the value of the pixel Pstart is subtracted and to which the value of the pixel Pend is added.

In this type of filter, called a recursive filter, prior values of the output of the filter are used in the computation. The output of the recursive filter depends on the input and the preceding value of the output.

In order to do the same for each of the pixels of the image, the circuit 15 translates the discrete lines along one of the axes X and Y so that none of the pixels ever overlaps another pixel. The circuit 15 computes the response of the filter at a pixel of the translated discrete line in using the same recursive procedure as the one described here above.

This procedure is used to compute the response of the application of a constant filter, at a given orientation *i, to an image, by a recursive method.

In one variant, the recursivity may be obtained in keeping to the order in which the pixels are stored in the data memory. For a rapid implementation on a classic architecture, the circuit 15 reads the image in the natural order of storage of the pixels in the data memory. An image is generally recorded in successive rows, and consequently the adjacent pixels in a memory will usually be placed in the same row. The pixels are processed one after the other in the order of storage. This makes it possible to provide the necessary information such as the previous response of the filter. This enables computation of the response of the filter on the image sequentially.

The circuit 15 thus preserves the property of recursivity for any orientation *i whatsoever of the filter.

Generalization of the Property of Separability of the Vertical Filter to the Filters Having Orientations *i:

The circuit 15 generalizes the property of separability to all the orientations *i of the filter as follows.

Should the orientation *i of the vertical filter be included in the interval [−*/4, */4], the circuit 15 considers the core of the non-constant filter to have an orientation *=*/2. This core is equal to [−1-1 . . . w times, 00 . . . g times, 22 . . . w times, 00 . . . g times, −1-1 . . . w times].

Should the orientation *i of the vertical filter being included in the interval [−*/2, −*/4 [and ]*/4, */2], the circuit 15 considers the core of the non-constant filter to have an orientation *=0 and it is equal to [−1-1 . . . w times, 00 . . . g times, 22 . . . w times, 00 . . . g times, −1-1 . . . w times]. This orientation of the core of the non-constant filter all the more facilitated as the matrix of the vertical filter is square.

Applying the filter with an orientation *i of the family therefore amounts to successively applying the recursive discrete constant filter with an orientation *i and then the non-constant filter with an orientation *.

Each filter of the family of the invention meets all the conditions and it has a better approximation when the filter is more elongated, for example when L/(3w+2g) is great.

Each filter of the family of the invention, as described, meets the requirements as regards properties of recursivity and separability, having simple coefficients, sum of coefficients equal to zero, and zero response to a linear contrast. Each filter of the family of the invention is also adapted to detecting the oriented lines giving a response proportional to the contrast of the line in the image.

The filters of the invention thus have coefficients used to provide zero responses when the background is flat or linear. Their responses do not depend on variations in the background of the image which are slow, low-frequency variations.

In one example, for a filter length L equal to 40 pixels, the circuit 15 generates a family of 25 filters with orientations *i. These filters are all separable, recursive, and fast.

The circuit 15 applies all the directional filters generated to the raw image 100. Each filter of the set of directional filters is designed to react strongly to the presence of structures having a given dimension and orientation.

Furthermore, for a given pixel of the raw image 100, the circuit 15 computes the 25 responses of the 25 filters. To obtain only one image instead of 25, the circuit 15 implements an algorithm for combining the responses of the filters.

Orientation Image:

For each pixel of the image, the circuit 15 determines an index representing the angle corresponding to the directional filter that gives the best response, in other words the greatest contrast. For each filter giving the greatest contrast to a given pixel, the circuit 15 assigns this pixel an index of orientation and the local direction of this filter. The circuit 15 outputs an image with an orientation 102 corresponding to the image in which each pixel has an index of orientation and the local direction of this filter assigned to it.

Combination of the Responses of the Filters to Obtain an Image of the Combined Responses 101a:

The structures to be detected by the circuit 15 in the raw image 100 are pixels belonging to pieces of guiding equipment which are often darker than the background of the image. In this case, the circuit 15 focuses only on the negative responses from the filters. The response given by the filters is proportional to the input contrast.

As a consequence, for a given pixel, the circuit 15 takes into account only the response of the filter herein producing the strongest negative response. The stronger the response, the greater the contrast in this direction at input.

This combination of responses may consist in taking the minimum response for each pixel of the image 100 among the set of responses of the filters oriented for this pixel. The fact of taking the minimum response makes it possible to de-noise the image of the combined responses 101a. The noise in the image of the combined responses 101a is smaller than the noise in each filtered image.

Otherwise, the combination of the responses may consist in taking the maximum of the absolute values of the responses of the filters when the pixels to be detected are both negative contrast pixels and positive contrast pixels.

The combination of the responses may also consist in taking the maximum of the responses of the filters when the pixels to be detected are positive contrast pixels.

The combination of the responses gives at output an image of the combined responses 101a noted 1M.

Standardization of the Image of the Combined Responses or Confidence Map:

There is no obvious way to interpret the values of the image of the combined responses 101a and know whether they indicate the local presence of an elongated structure, either significant or not significant. The combination of the responses has an impact on the statistics of the noise. Consequently, the combination of the responses given by the filters cannot be interpreted directly.

In order to obtain a good interpretation of the combined responses, the circuit 15 implements a standardization algorithm 29. This standardization algorithm 29 depends on the probability of the reaction of the response of the family of filters in the random noise. This standardization step resets the background of the image at zero and sets the standard deviation of the noise at 1.

To this end, the circuit 15 makes a random noise image having constant properties for each pixel, the same mean m and the same standard deviation herein noted * with realistic properties of noise, for example in taking the spatial correlation of the noise into consideration.

The circuit 15 filters the noise image with each of the generated directional filters. Then, the circuit 15 computes the image of the combined responses of the noise image in applying the response combination algorithm to the filtered noise image. The circuit 15 extracts a mean parameter m' and a standard deviation parameter *' from this image of the combined responses.

The circuit 15 standardizes the mean m' as M and the mean standard deviation *' as δ in performing the following operations: M=m/* and δ=*'/*.

For any given clinical sequence characterized by a standard deviation of the initial noise, denoted B, the circuit 15 computes the standardized image of the combined responses 101 or confidence map of the pixels in performing the following standardization operation for each pixel Pi:

$$map(pi)=(IM(pi)-M*B)/(δ*B)$$

The value assigned to the pixels of the confidence map 101 is interpreted as being the contrast-to-noise ratio. This interpretation is due to the fact that in the standardized image of the combined responses 101, the standard deviation of the noise is equal to 1 and the mean is zero. This contrast-to-noise ratio can be directly exploited for subsequent processing of the radioscopic images.

The standardization algorithm depends only on the statistics for the input noise. Consequently, this standardization can be done in advance, once and for all. Furthermore, the standardization parameters are proportional to the standard deviation of the input noise.

For example, if the value of a given pixel of the map 101 is equal to zero, the observed value is a typical value of a random noise. Consequently, this pixel cannot be considered to belong to a elongated object. It is almost certain that this pixel has nothing of great interest. Furthermore, if the value of a given pixel of the map 101 is equal to 4, the probability of such a response being produced in the noise is very low, since it is distant from the mean of the noise of four standard deviations.

The circuit 15 can use mathematical models or simulations for the precise computation of the probability that a range of given values comes from the random noise. Consequently, the circuit 15 can determine a threshold of contrast-to-noise ratio to be applied to the image of the standardized combined responses 101. This threshold can be defined beforehand.

When the value assigned to the pixel is above the threshold, the circuit 15 assigns the pixel a elongated pixel attribute. It maintains the value of this pixel in the image of the standardized combined responses 101. If the value assigned to the pixel is not above the threshold, the circuit 15 assigns the pixel a non-elongated pixel attribute and a zero value in the image of the standardized combined responses 101.

An elongated or non-elongated pixel attribute is a marker created by the circuit 15 to indicate the presence of a elongated or non-elongated pixel in the image of the standardized combined responses 101. These markers can be a graphic annotation, especially a triangle, a square, or even a letter or a figure situated at the position of said pixel. They may also be a binary number. These markers can be used for the color imaging of their location.

In order to increase the precision of the confidence map and of the orientation image, the results of the confidence maps as well as of the orientation images calculated here above can be used.

Non-Elongated Guiding Equipment:

The filter of the invention is adapted to elongated, low-contrast guiding equipment. However, when the guiding equipment is highly curved, the circuit 15 gives an image of the combined responses 101a comprising artifacts.

The invention eliminates these artifacts by adapting the family of specific detection filters of the invention to the shape of the object to be detected. To this end, the invention implements a technique of a filter broken into two. For each filter of each orientation of the family of filters, the circuit 15 determines two corresponding partial filters. These two partial filters have the same properties as the main filter with an orientation *i. They are both elongated. They belong to the same family except that their orientation is different. They are furthermore placed end to end. Preferably, their length is L/2 each. The point for which the filtering processing is done is the meeting point of the two filters placed end to end.

To compute the response of the broken filter, the circuit 15 first of all determines for each orientation *i two partial filters with a length L/2. These partial filters are acquired for a half-period of the acquisition period of the filter having a length L of FIG. 3. These partial filters have the same properties as the family of filters defined in FIG. 3.

The circuit 15 applies each partial filter with a length L/2 to the raw image 100. One of the partial filters gives the response G and the other partial filter gives the response H. The responses of the half-filters are stored in the data memory. The circuit 15 then, using a function f(G,H), combines the responses of the partial filters obtained to obtain the response of the broken filter with a length L of an orientation *i.

For a given pixel, the circuit 15 takes account not only of the sum of respective responses G and H of the partial filters as in the case of a piece of elongated equipment but also the subtraction of these respective values G and H from the partial filters.

The invention described here above for the elongated objects corresponds to the function f such that f(G,H)=G+H.

In a preferred generalized embodiment for elongated or curved objects, the function f is such that:

$$f(G+H)=(G+H)\ \square\ v\ (G+H, G-H)$$

where v is a preliminarily defined function.

In a preferred embodiment:

$$f(G+H)=(G+H)\ \square\ \text{exponential}\ [-((G-H)/k(G+H)\ \square\ (G-H)/1(G+H))]$$

where k is a preliminarily defined parameter, k is a parameter that makes it possible to define the shape of the type of object to be analyzed. For example, if k has a value close to zero, the type of object to be analyzed is a rectilinear segment. The greater the value of k, the more curved is the object to be analyzed.

Figure 4:
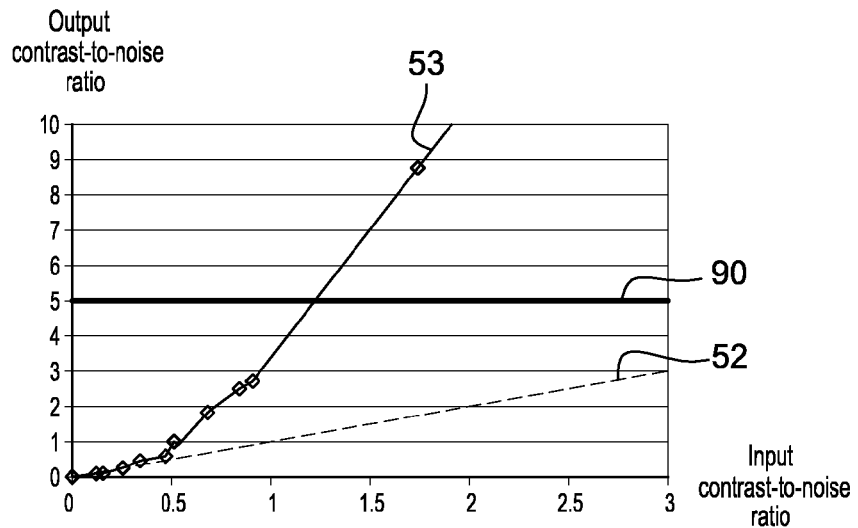
FIG. 4 is a graph showing the efficiency of the result of the detection filtering operation of the invention compared with the result of a prior-art detection filtering operation.

Demonstration of the Performance of the Detection Technique of the Invention:

FIG. 4 is a comparison graph showing different curves of contrast-to-ratio ratio. The x-axis of the graph represents the contrast-to-noise ratio at input of the circuit 15. These values are low and are range from 0 to 3. The y-axis represents a contrast-to-noise ratio at output of the circuit 15. These values are high and may be greater than 10.

The curve 52 shown in dashes illustrates the contrast-to-noise ratio on the noise signals of the pixels of the guiding equipment. It is the identity curve for which there is no improvement in the contrast-to-noise ratio. The curve 53 illustrates the contrast-to-noise ratio of the pixels of the guiding equipment as improved by the invention. The filter used by the circuit 15 to obtain the curve 53 is a fiber with a length L=41, with w=3 and g=0. The graph of FIG. 4 shows that the curve 53 of the invention moves away significantly from the identity curve 52 thus demonstrating the capacity of the detection algorithm of the invention to detect objects with a low contrast-to-noise ratio and create an image in which the contrast-to-noise ratio is generally high.

The curve 53 shows us that with very low contrast-to-noise ratios of the order of 1 at input, the contrast-to-noise ratio is strongly determined at output. With the invention, once the object to be detected has a longitudinal sector, the output contrast-to-noise ratio is great.

In order to detect the elongated objects with an error rate of less than 1%, the circuit 15 computes a threshold 90 equal to 5 in an output contrast-to-noise ratio.

Thus, objects not detected with a simple measurement of the contrast-to-noise ratio in the raw image 100 are now detectable with the confidence map 101 by simple thresholding according to the invention.

With the invention, as soon as the contrast-to-noise ratio, computed for a given pixel, is above the threshold, the circuit 15 keeps the value of this ratio for it by way of a value of an image of the standardized combined responses 101. If the contrast-to-noise ratio for this given pixel is not above the threshold, the circuit 15 assigns it a zero value.

Other directional filters can be used instead of the filter described in FIG. 3.

Application of an Enhancement Algorithm 32 to the Raw Image 100:

The enhancement process consists in increasing the intensity of the pixel relative to the intensity of the environment surrounding the pixel. The immediate environment of a pixel is defined as a set of pixels situated at a distance below a distance D of said pixel. This distance D is a preliminarily defined parameter.

Present-day enhancement techniques have the effect of enhancing the signal as much as the noise. This is why, before enhancing the pixels, the circuit 15 of the invention first of all applies a smoothing algorithm 105 (see FIG. 8) to the raw image 100, followed by an enhancement algorithm 32.

The application of the smoothing algorithm 105 to the raw image 100 reduces the noise present. Sensory experiments have shown that smoothing the signal of the guiding equipment creates a visual impression of loss of contrast even though the contrast of the guiding equipment is perfectly preserved. Since the guiding equipment is darker than its background, the initial noise present in the guiding equipment does produce an impression of high contrast and the smoothing creates a visual impression of a reduction of contrast. To resolve this problem of visual impression, the invention applies a smoothing algorithm to the raw image 100 while at the same time preserving the dark peaks caused by noise within the guiding equipment, thus increasing the contrast of the pixels of the guiding equipment. The enhancement is thus locally specific.

Figure 5:
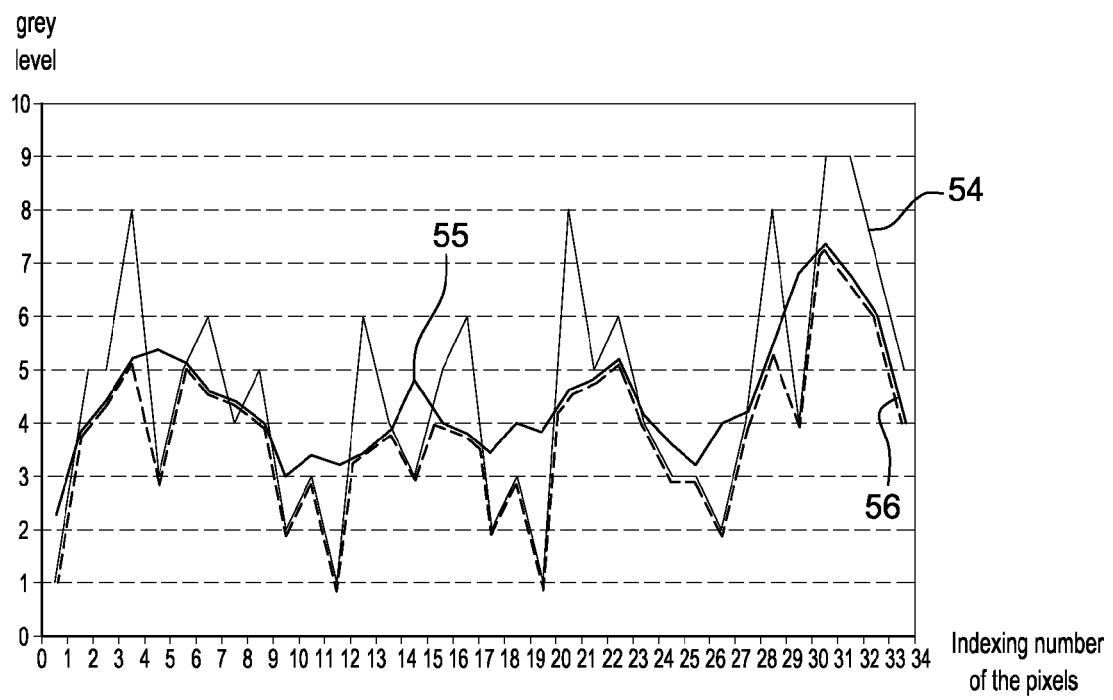
FIG. 5 is a graph showing the application of the enhancement algorithm to a radioscopic image according to the invention.

The smoothing algorithm applied to the pixels of the raw image 100 is illustrated in FIG. 5. The y-axis of FIG. 5 represents the grey level and the x-axis represents the index number of the pixels in the raw image 100. The curve 54 corresponds to the signal of the raw image 100.

In a first enhancement step, the circuit 15 applies the smoothing algorithm 105 to the raw image 100. This smoothing algorithm 105 is implemented by a smoothing filter. The parameters of this smoothing filter are computed as a function of the raw image 100 to be processed, the confidence map 101 of said image and, as the case may be, previously acquired raw images and their previously computed respective confidence maps for each these images. This makes it possible to obtain a fairly powerful filter capable of smoothing and preserving the pixels of the guiding equipment.

The circuit 15 assigns each pixel a value corresponding to a mean or a sum weighted by the values of the pixels situated in an immediate neighborhood of said pixel. This immediate neighborhood is defined by the direction given by the orientation image 102 for said pixel. Thus, at each pixel Pi, the circuit 15 orients the filter in the direction determined in the orientation image 102, i being the indexing number of the pixel P. The smoothing filter outputs an smoothing image 106 represented by the smoothing curve 55.

In a preferred example, the smoothing filter to be applied to the raw image 100 may be a simple and constant filter with a size or width equal to one pixel and a length equal to 11 pixels, in the appropriate direction. Other types of directional, oriented smoothing filters which may or may not be linear can be used. In general, the coefficients of a smoothing filter can be given manually or by a mathematical function.

In a second enhancement step, the circuit 15 compares the curve 54 of the raw image 100 with the smoothed curve 55 and produces the curve 56. It therefore compares the smoothened grey level of each pixel Pi with the grey level of the corresponding pixel in the raw image 100. If the grey level of corresponding pixel in the raw image 100 is lower than the smoothened grey level of said pixel, then the circuit 15 assigns this pixel the grey level of said pixel in the raw image 100. Otherwise, it assigns it the smoothened grey level.

Consequently, the circuit 15 assigns each pixel of the curve 54, a grey level denoted NLS determined according to the following equation:

$$NLS(Pi) = \text{minimum (curve 54 } (Pi); \text{ curve 55 } (Pi)).$$

A method of this kind performs a smoothing operation in preserving the dark peaks in the image. The result 107 of this comparison is illustrated by the curve 56 in dots and dashes.

In a third enhancement step, the circuit 15 computes an estimation 108 of the background image. To this end, in a preferred embodiment, the circuit 15 determines a filter oriented for each pixel of the raw image 100. The parameters of this filter computed for each pixel are based on the values of pixels present in two parallel segments 57. The determining of these two segments is shown in FIG. 6. In the example of FIG. 6, these two segments 57 are separated by a space 58, preferably wider than the size of guiding equipment 59. For each pixel 60 of the raw image 100, the direction of the segments 57 is parallel to the local orientation 61 of the pixel 60. This local orientation 61 is given by the orientation image 102. For each pixel 60, the orientation of the filter to be determined is identical to the orientation of the segments 57. For each pixel 60 of the guiding equipment, the two directions of the segments 57 demarcate the edges of the background, thus enabling the circuit 15 to compute a mean background value called b between these edges.

The value of a filter used between these segments to compare a mean value of the background image can be a simple constant. This filter between these segments may correspond to a Gaussian weighting perpendicular to the orientation of the segments. It can be used to compute a weighted mean value of the background image. The filter used to estimate the background image may also be a non-linear filter or any other known filter.

In a fourth enhancement step, the circuit 15 computes an enhancement value E for each pixel Pi of the curve 54 of the raw image 100. To this end, the circuit 15 defines E as the follows:

$E(Pi)=u \times b(Pi)+(1-u) \times NLS(Pi)$ with u being a number greater than one. The greater the parameter u, the greater will be the enhancement of the contrast. The enhancement algorithm 32 outputs an enhanced image 103 as shown in FIG. 8.

The circuit 15 now has four images available to achieve fusion (see FIG. 8);
 the raw image 100,
 the image of the standardized combined responses 101 also called a confidence map;
 the enhanced image 103, and
 the de-noised image 104.

The circuit 15 combines the raw image 100 with the de-noised image 104 and the enhanced image 103 as a function of the confidence map 101 in order to produce a fusion image 110 in which the pixels of the guiding equipment will be as visible as possible.

The fusion operation 109 uses the de-noised image 104 multiplied by a coefficient a. The coefficient a corresponds to a value of the function A represented by the curve 62 in FIG. 7. The x-axis of the graph of FIG. 7 represents values of the confidence map 101. The y-axis represents the values of coefficients of the functions A, B and C.

On the y-axis, this curve 62 gives values of coefficients smaller than or equal to 1 for possible values of the confidence map 101. The curve 62 is significant and decreasing for values of the confidence map 101 below 4. It is zero thereafter. The image produced is called the image A. The curve 62 represents the weighting operation to be applied to pixels for which it is almost certain that they result from noise.

The fusion operation 109 uses the enhanced image 103 multiplied by a coefficient b. The coefficient b corresponds to a value of the function B represented by the curve 63 in FIG. 7. On the y-axis, this curve 63 gives values of coefficients smaller than or equal to 1 for possible values of the confidence map 101. The curve 62 is significant and rising for values of the confidence map 101 greater than 4. Before that, it is equal to zero. This is done in order to avoid the acceptance of many false positive in the fusion image since the contrast of the signal is enhanced. A high rate of false positives would create an image of very poor quality. The curve 63 is thus defined with B(<4)=0 and B tending towards 1 at infinity. The image produced is called the image B. The curve 63 then represents the weighting operations to be applied to pixels for which it is almost certain that they belong to an elongated object.

The fusion operation 109 uses the raw image 100 multiplied by a coefficient c. The coefficient c corresponds to a value of the function C represented by the curve 64 in FIG. 7. On the y-axis, this curve 64 shows values of coefficients smaller than or equal to 1 for possible values of the confidence map 101. The curve 64 is significant and rising for values of the confidence map 101 ranging from 0 and 8. The image produced is an image C. The curve 64 represents weighting operations to be applied to pixels for which it is not certain that they belong to a elongated object.

The coefficients a, b and c are such that a+b+c=1. The coefficients a, b and c can be read approximately and directly on the graph of FIG. 7.

The fusion operation 109 combines the images A, B and C, pixel by pixel, in order to ultimately show a pixel value to be viewed.

The functions A, B and C are shown here by way of examples. These functions may be modified during the fusion as a function of the operator's wishes, depending on whether he wants a fusion image that is more de-noised or less de-noised, more enhanced or less enhanced or has not lost information to a greater degree or a lesser degree.

In an embodiment, a method for the processing of images produced by an radioscopic apparatus has one or more of the following steps and/or characteristics:
 exposing a patient's body to radiation;
 obtaining a raw image representing an internal structure of the body through a detector;
 determining a family of directional 2D filters, to be applied to the raw image;
 convoluting the raw image successively with the filters of the family of directional filters;
 obtaining, from the responses of the filters of the family of filters, a confidence map in which each pixel is assigned a confidence value corresponding to the responses of the filters;
 determining a de-noising filter, the parameters of which are computed, for each pixel, as a function of the raw image and of the corresponding confidence map;
 applying this de-noising filter to the raw image to produce a de-noised image at output;
 producing an enhanced image in which, for each pixel of the raw image, an intensity of the grey levels of said pixel is enhanced relative to the predefined immediate environment of said pixel;
 producing a fusion image by combining the raw image with the enhanced image and the de-noised image, pixel by pixel, as a function of the value of said pixel in the confidence map; and
 displaying or viewing the fusion image.

In an embodiment, the directional 2D filters of the family of filters are orientable, separable and recursive.

In an embodiment, the method also includes determining, for each filter for the family of filters, an orientation θi in a range of predefined orientations θi, wherein i belongs to an interval [1, n], n being equal the number of filters of the family of filters to be generated.

In an embodiment, for each orientation θi, the corresponding filter is separated into two 1D filters:
 one filter that is constant in one direction, and
 one filter that is non-constant in another direction.

In an embodiment, for each orientation θi, the constant 1D filter is formulated as a discrete constant 1D filter.

In an embodiment, for each orientation θi, the discrete constant 1D filter is formulated recursively.

In an embodiment of the invention, the orientation θi of a filter of the family of filters corresponds to the angle formed by the direction in which the filter is constant with the y-axis.

In an embodiment of the invention, each directional 2D filter of the family of filters has a core that includes:
 a central block with a width w and a length L for which the value of coefficients of this block is equal to 2;

two intermediate blocks situated on either side of the central block with a size g and a length L and for which the value of their coefficients is equal to zero; and two final blocks situated respectively beside the intermediate blocks with a width w and a length L and for which the value of their coefficients is equal to −1.

In an embodiment of the invention, the width w is equal to 3 pixels.

In an embodiment of the invention, the range of orientations θi i is included in the intervals [−π/2, π/2].

In an embodiment of the invention, the number n of filters to be generated is equal to (2*L−2)/w when g=0.

In an embodiment of the invention, formulating the constant 1D filter as a discrete constant 1D filter includes converting, for each orientation θi of a filter of the family of filters, a constant 1D filter into a discrete constant 1D filter by applying a Bresenham algorithm to the constant 1D filter.

In an embodiment of the invention, convoluting the raw image with the filters of the family of directional filters includes:

successively applying, for each orientation θi of a filter of the family of filters, the recursive, discrete, constant filter and the non-constant filter of said filter to the raw image;

combining the set of the responses obtained from applying the family of filters for each orientation θi to the raw image to produce an image of the combined responses;

producing a confidence map from the image of the combined responses; and producing an orientation image in which each pixel is assigned an orientation index and a local direction of the filter of the family of filters giving the highest contrast at this pixel.

In embodiment of the invention, combining the responses of the filters includes assigning each pixel of the raw image the minimal response from among the set of responses of the filters of the family of filters for this pixel.

In an embodiment, combining the responses of the filters includes assigning each pixel of the raw image the maximum of the absolute values of the set of responses of the filters of the family of filters for this pixel.

In an embodiment of the invention, combining the responses of the filters includes assigning each pixel of the raw image the maximum of the responses of the set of the responses of the filters of the family of filters for this pixel.

In an embodiment of the invention, producing the confidence map includes:

performing a standardization of the image of the combined responses relative to a predefined image of the noise;

assigning each pixel the result of the standardization obtained at said pixel, wherein the result of the standardization corresponds to a value of contrast-to-noise ratio; and preliminarily determining a threshold of contrast-to-noise ratio, wherein when the value of the contrast-to-noise ratio of the pixel is above said threshold, the method further comprises:

assigning the pixel an elongated pixel attribute; and maintaining the assigned value of the contrast-to-noise ratio for this pixel, and wherein when the value of the contrast-to-noise ratio of the pixel is not above said threshold, the method further comprises:

assigning the pixel a non-elongated attribute and a zero value of contrast-to-noise ratio.

In an embodiment of the invention, the de-noising filter is a spatial filter followed by an adaptive temporal filter.

In an embodiment of the invention, the spatial filter is a wavelet filter and the temporal filter is a recursive temporal filter.

In an embodiment of the invention, enhancing the intensity of pixels of the raw image, includes:

determining a smoothing filter with parameters computed, for each pixel, as a function of the raw image and of a corresponding confidence map;

applying the smoothing filter to the raw image, wherein the smoothing filter is configured to output an smoothed image in which, for each pixel of the raw image, a smoothed grey level is assigned corresponding to a mean or to a weighted sum of the grey level of the pixels situated in an immediate neighborhood of said pixel, wherein the immediate neighborhood is defined by a direction given by the orientation image for said pixel;

comparing the smoothed grey level of each pixel with the grey level of said pixel in the raw image;

assigning each pixel Pi of the raw image a grey level NLS (Pi) corresponding to the minimum grey level between the grey level of said pixel in the raw image and the smoothed grey level in the smoothed image;

estimating a background b of the raw image; and computing an enhancement value E for each pixel Pi of the raw image, wherein E is defined by the following equation $E(Pi)=u \times b(Pi)+(1-u) \times NLS(Pi)$ with u being a number greater than one. In an embodiment, the greater the parameter u, the greater is the enhancement of the contrast.

Advantageously again according to an embodiment of the invention:

the smoothing filter is a non-linear and directional oriented filter, and a direction of this filter is given by the orientation image Advantageously again according to an embodiment of the invention, the smoothing filter to be applied to the raw image is a simple and constant filter with a width equal to one pixel and a length equal to 11 pixels.

Advantageously according to an embodiment of the invention, estimating the background b of the raw image includes:

determining an oriented filter for each pixel of the raw image;

determining an orientation index of each pixel of the raw image from the orientation image;

determining for each pixel, two segments separated by a space and parallel to the orientation index of said pixel, these two segments demarcating the edges of the background; and computing a background mean for each pixel, by applying the oriented filter to said pixel, between the edges of these two segments.

Advantageously again according to an embodiment of the invention, fusing the raw image with the enhanced raw image and the de-noised image as a function of the confidence map includes:

multiplying the de-noised image by a coefficient a giving an image A, wherein the coefficient a corresponds to a value of a function A, wherein this function A is significant and decreases for values of a confidence map below 4, wherein the coefficient a is smaller than or equal to 1 for possible values of the confidence map;

multiplying the enhanced image by a coefficient b giving an image B, wherein the coefficient b corresponds to a value of a function B, wherein this function B is significant and increasing for values of the confidence map greater than 4, wherein the coefficient b is smaller than or equal to 1 for possible values of the confidence map;

multiplying the raw image by a coefficient c giving an image C, wherein the coefficient c corresponds to a value of a function C, wherein this function C is significant and increasing for values of the confidence map ranging from 0 to 8, wherein the coefficient c is smaller than or equal to 1 for possible values of the confidence map; and combining the images A, B and C are combined, pixel by pixel, to give the fusion image.

Advantageously again according to the invention, the coefficients a, b and c are such that a+b+c=1.

An embodiment of the invention also pertains to an apparatus for the implementation of said image-processing method in interventional radioscopy to produce a sequence of de-noised fusion images in which elongated objects are preserved and enhanced.

What is claimed is:

1. A method for the processing of images produced by an radioscopic apparatus, the method comprising:
exposing a patient's body to radiation;
obtaining a raw image representing an internal structure of the body through a detector;
determining a family of directional 2D filters, to be applied to the raw image;
convoluting the raw image successively with one or more filters of the family of directional 2D filters;
obtaining from responses of the one or more filters of the family of 2D filters, a confidence map in which each pixel is assigned a confidence value corresponding to the responses of the one or more filters of the family of 2D filters;
determining a de-noising filter, the parameters of which are computed, for each pixel, as a function of the raw image and of the corresponding confidence map;
applying the de-noising filter to the raw image to produce a de-noised image output;
producing an enhanced image in which, for each pixel of the raw image, an intensity of the grey levels of said pixel is enhanced relative to the predefined immediate environment of said pixel;
producing a fusion image by combining the raw image with the enhanced image and the de-noised image, pixel by pixel, as a function of the value of said pixel in the confidence map; and
displaying the fusion image for viewing.

2. The method of claim 1, wherein a filter of the one or more filters of the family of directional 2D filters is orientable, separable or recursive.

3. The method of claim 2, further comprising:
determining for each of the one or more filters of the family of directional 2D filters, an orientation θi in a range of predefined orientations θi, wherein i belongs to an interval [1, n], wherein n is equal the number of one or more filters of the family of 2D filters to be generated;
separating, for each orientation θi, a corresponding one of the one or more filters into two 1D filters,
wherein one of the two 1D filters is constant in one direction, and
wherein one of the two 1D filters is non-constant in another direction;
formulating for each orientation θi, the constant 1D filter as a discrete constant 1D filter; and
formulating, for each orientation θi, the discrete constant 1D filter recursively.

4. The method of claim 3, wherein the orientation θi of a filter of the one or more filters of the family of directional 2D filters corresponds to an angle formed by a direction in which the filter is constant with respect to a Y-axis.

5. The method of claim 1, wherein each directional 2D filter of the family of directional 2D filters has a core comprising:
a central block with a width w and a length L for which a value of coefficients of this block is equal to 2;
two intermediate blocks situated on either side of the central block with a size g and a length L and for which a value of their coefficients is equal to zero; and
two final blocks situated respectively beside the intermediate blocks with a width w and a length L and for which a value of their coefficients is equal to −1.

6. The method of claim 5, wherein the width w is equal to three (3) pixels.

7. The method of claim 3, wherein for the range of orientations θi, i is any value in an interval [−π/2, π/2].

8. The method of claim 3, wherein, the number n of filters to be generated is equal to (2* L-2)/w when g=0.

9. The method of claim 3, wherein formulating the constant 1D filter as a discrete constant 1D filter comprises:
converting, for each orientation θi of a filter of the one or more filters of the family of directional 2D filters, the constant 1D filter into a discrete constant 1D filter by applying a Bresenham algorithm to said constant 1D filter.

10. The method of claim 1, wherein convoluting the raw image with the one or more filters of the family of directional 2D filters comprises:
applying successively, for each orientation θi of a filter of the one or more filters of the family of directional 2D filters, a recursive, discrete, constant filter and a non-constant filter to the raw image;
combining a set of the responses obtained by the applying the one or more filters of the family of directional 2D filters to the raw image to produce an image of the combined responses;
producing a confidence map from the image of the combined responses; and
producing an orientation image in which each pixel is assigned an orientation index and a local direction of the filter of the one or more filters of the family of directional 2D filters that provides a highest contrast at each pixel.

11. The method of claim 10, wherein combining the responses of the filters comprises:
assigning each pixel of the raw image a minimal response from among the set of responses of the one or more filters of the family of directional 2D filters for each pixel.

12. The method of claim 10, wherein combining the responses of the filters comprises:
assigning each pixel of the raw image a maximum of absolute values of the set of responses of the one or more filters of the family of directional 2D filters for each pixel.

13. The method of claim 10, wherein combining responses of the filters comprises:
assigning each pixel of the raw image a maximum of the responses of the set of the responses of the one or more filters of the family of directional 2D filters for each pixel.

14. The method of claim 1, wherein producing the confidence map comprises:
performing a standardization of the image of the combined responses relative to a predefined image of noise;
assigning each pixel a result of the standardization obtained at each pixel, wherein the result of the standardization corresponds to a value of contrast-to-noise ratio;

determining preliminarily a threshold of contrast-to-noise ratio;
wherein when the value of the contrast-to-noise ratio of a pixel is above said threshold, then the method further comprises:
assigning the pixel an elongated pixel attribute; and
maintaining the assigned value of the contrast-to-noise ratio for this pixel;
wherein when the value of the contrast-to-noise ration of a pixel is not above said threshold, then the method further comprises:
assigning the pixel a non-elongated attribute and a zero value of contrast-to-noise ratio.

15. The method of claim 1, wherein the de-noising filter is a spatial filter followed by an adaptive temporal filter.

16. The method of claim 15, wherein the spatial filter is a wavelet filter and the temporal filter is a recursive temporal filter.

17. The method of claim 1, wherein enhancing the intensity of pixels of the raw image comprises:
determining a smoothing filter with parameters computed, for each pixel, as a function of the raw image and of the corresponding confidence map;
applying the smoothing filter to the raw image, wherein this smoothing filter is configured to output a smoothed image in which, for each pixel of the raw image, a smoothed grey level is assigned corresponding to a mean or to a weighted sum of the grey level of the pixels situated in an immediate neighborhood of said pixel, wherein the immediate neighborhood is defined by a direction given by the orientation image for said pixels;
comparing the smoothed grey level of each pixel with a grey level of each pixel in the raw image:
assigning each pixel Pi of the raw image a grey level NLS (Pi) corresponding to a minimum grey level between the grey level of each pixel in the raw image and the smoothed grey level in the smoothed image;
estimating a background b of the raw image;
computing an enhancement value E for each pixel Pi of the raw image, wherein E is defined by the following equation $E(Pi)=u \times b(Pi)+(1-u) \times NLS(Pi)$ with u being a number greater than one, wherein the greater the parameter u, the greater will be the enhancement of the contrast.

18. The method of claim 17, wherein:
the smoothing filter is a non-linear and directional oriented filter, and
a direction of this filter is given by the orientation image.

19. The method of claim 17, wherein the smoothing filter to be applied to the raw image is a simple and constant filter with a width equal to one pixel and a length equal to eleven (11) pixels.

20. The method of claim 17, wherein estimating the background b of the raw image comprises:
determining an oriented filter for each pixel of the raw image;
determining an orientation index of each pixel of the raw image from the orientation image;
determining for each pixel, two segments separated by a space and parallel to the orientation index of said pixel, wherein these two segments demarcate edges of the background; and
computing a background mean for each pixel by applying the oriented filter to each pixel, between the edges of these two segments.

21. The method of claim 1, wherein fusing the raw image with the enhanced raw image and the de-noised image as a function of the confidence map comprises:
multiplying the de-noised image by a coefficient a giving an image A,
wherein the coefficient a corresponds to a value of a function A,
wherein this function A is significant and decreases for values of the confidence map below 4,
wherein the coefficient a is smaller than or equal to 1 for possible values of the confidence map;
multiplying the enhanced image by a coefficient b giving an image B,
wherein the coefficient b corresponds to a value of a function B,
wherein this function B is significant and increases for values of the confidence map greater than 4,
wherein the coefficient b is smaller than or equal to 1 for possible values of the confidence map;
multiplying the raw image by a coefficient c giving an image C,
wherein the coefficient c corresponds to a value of a function C.,
wherein this function C is significant and increases for values of the confidence map ranging from 0 to 8,
wherein the coefficient c is smaller than or equal to 1 for possible values of the confidence map; and
combining the images A, B and C, pixel by pixel, to produce the fusion image.

22. The method of claim 21, wherein the coefficients a, b and c each have a value that satisfies: $a+b+c=1$.

* * * * *